United States Patent
Schulz et al.

(10) Patent No.: US 7,573,894 B2
(45) Date of Patent: Aug. 11, 2009

(54) METHOD OF DYNAMIC ADAPTATION FOR JITTER BUFFERING IN PACKET NETWORKS

(75) Inventors: Dieter Schulz, Dunrobin (CA); Lee Dilkie, Stittsville (CA)

(73) Assignee: Mitel Networks Corporation, Ottawa, Ontario ( * ) Notice: Subject to any disclaimer, the term of this patent is extended or adjusted under 35 U.S.C. 154(b) by 845 days.

(21) Appl. No.: 10/780,220

(22) Filed: Feb. 17, 2004

(65) Prior Publication Data

US 2005/0180443 A1    Aug. 18, 2005

(51) Int. Cl.
H04L 12/54    (2006.01)
H04L 12/56    (2006.01)
H04J 3/06    (2006.01)

(52) U.S. Cl. .................. 370/412; 370/429; 370/516; 709/214

(58) Field of Classification Search ......... 370/412–429, 370/508–516, 235–252; 709/214–231
See application file for complete search history.

(56) References Cited

U.S. PATENT DOCUMENTS

| | | | |
|---|---|---|---|
| 6,603,749 B1 | 8/2003 | Vejlgaard | |
| 6,603,759 B1 * | 8/2003 | Moskal et al. | 370/352 |
| 6,658,027 B1 * | 12/2003 | Kramer et al. | 370/516 |
| 6,671,258 B1 * | 12/2003 | Bonneau | 370/235 |
| 6,829,244 B1 * | 12/2004 | Wildfeuer et al. | 370/412 |
| 6,862,298 B1 * | 3/2005 | Smith et al. | 370/516 |
| 6,904,059 B1 * | 6/2005 | Newson et al. | 370/516 |
| 6,922,408 B2 * | 7/2005 | Bloch et al. | 370/389 |
| 7,006,511 B2 * | 2/2006 | Lanzafame et al. | 370/412 |
| 7,079,486 B2 * | 7/2006 | Colavito et al. | 370/231 |
| 7,170,856 B1 * | 1/2007 | Ho et al. | 370/230 |
| 2002/0167911 A1 * | 11/2002 | Hickey | 370/252 |
| 2003/0026275 A1 | 2/2003 | Lanzafame et al. | |
| 2003/0081597 A1 * | 5/2003 | Scott | 370/378 |
| 2003/0091047 A1 | 5/2003 | Pate et al. | |
| 2003/0169755 A1 * | 9/2003 | Ternovsky et al. | 370/412 |
| 2003/0202528 A1 * | 10/2003 | Eckberg | 370/412 |
| 2004/0022262 A1 * | 2/2004 | Vinnakota et al. | 370/429 |
| 2005/0058146 A1 * | 3/2005 | Liu et al. | 370/412 |

* cited by examiner

Primary Examiner—Man Phan

(57) ABSTRACT

A method of controlling a buffer for reducing jitter in a packet network is provided, with a fast attack and a slow decay time to track delay changes in the network. The principal function of the method for controlling the jitter buffer is to minimize the delay within the buffer and use packet loss compensation in the event that the buffer enters an underflow condition.

2 Claims, 5 Drawing Sheets

METHOD OF DYNAMIC ADAPTATION FOR JITTER BUFFERING IN PACKET NETWORKS

FIELD OF THE INVENTION

The present invention relates generally to digital transmission systems, and more particularly to a method for reducing perceived network jitter by varying the amount of delay induced by a jitter buffer in a packet network.

BACKGROUND OF THE INVENTION

In packet-switched voice communication, maximum voice quality is achieved when voice packets arrive in the order that they were transmitted, at the exact rate that they are transmitted, and with the shortest possible transmission delay. However, the nature of data transmission in packet-switched or IP networks inherently gives rise to transmission delays (i.e. jitter) that may vary widely due to available bandwidth, number of nodes traversed by the packets, network congestion, etc. Packets can also be duplicated by network switching equipment or dropped. In addition, as a consequence of packet routing policies that are commonly employed, it is also possible for packets to arrive at an endpoint in a different order than they were transmitted.

It is known in the art to use data buffers when receiving voice packets, to ameliorate the effects of network jitter. For example, U.S. Pat. No. 6,603,749, entitled Adaptive Buffer Management for Voice Over Packet network, by Andre Moskal and Andre Diorio, discloses a fixed length adaptive buffer, wherein the length of the buffer is a compromise between introduced delay and induced packet loss due to underflow or overflow. The fixed length adaptive buffer is effective on well-conditioned networks. However, on less well managed networks (e.g. jitter greater than 40 ms) such as the Internet, the jitter often exceeds the size of the buffer. Consequently, the buffer actually introduces additional packet loss.

Accordingly, much research has centered on methods that dynamically adapt the buffer length according to current network conditions. Dynamic jitter buffers reduce the effects of variable transmission delay by introducing additional delay at the packet receiver. This has the benefit of requiring no special consideration at the packet transmitter. Dynamic jitter buffers reduce perceived network jitter by varying the amount of delay induced by the jitter buffer according to detected changes in network transmission delay.

Several approaches in the literature use adaptation to dynamically adjust the buffer to current changes in network delay. Adaptation techniques include LMS, neural networks, and fuzzy logic. Other methods use state machines, as set forth in Dynamic Jitter Buffering for Voice-Over-IP and Other Packet-Based Communication Systems (U.S. patent application Ser. No. 2003026275). Unfortunately, these tend to suffer from implementation complexities.

SUMMARY OF THE INVENTION

According to the present invention, a simple, state-less adaptation control algorithm is provided, with a fast attack and a slow decay time to track delay changes in the network. The principal function of the algorithm for controlling the jitter buffer is to minimize the delay within the buffer (at the expense of occasional buffer underflow). Traditionally, jitter buffers attempt to smooth out jitter by preventing underflow, whereas minimizing the delay within the buffer is a secondary consideration. Although such prior art buffers prevent more underflow errors than the system of the present invention, they tend to introduce longer delays. For example, the fixed buffer discussed above in connection with U.S. patent application Ser. No. 6,603,749, is an example of a buffer control algorithm that maintains an average midpoint within the buffer.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
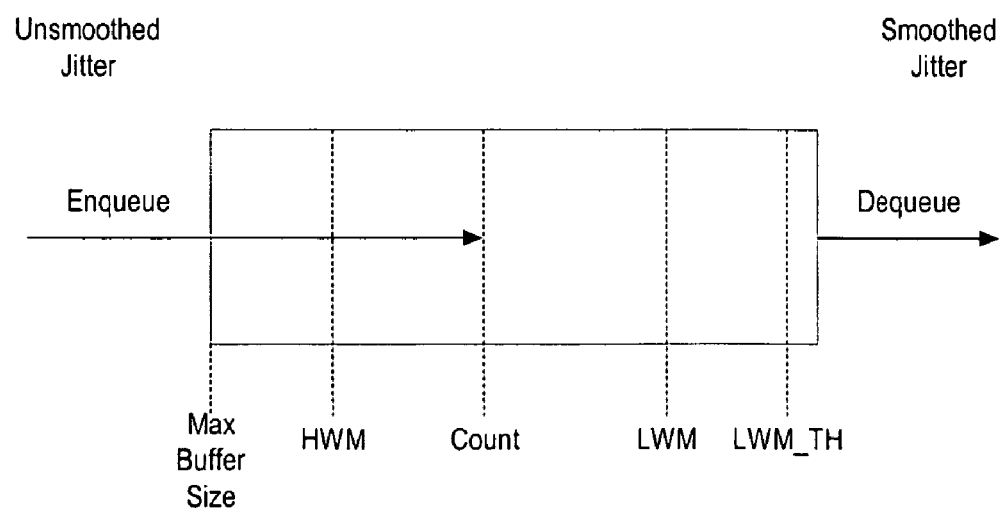
FIG. 1 is a schematic representation of an adaptive jitter buffer according to the present invention.

FIG. 1 shows an adaptive jitter buffer according to the present invention, for enqueueing data packets that have been subjected to unsmoothed jitter and dequeueing the data at a steady rate so that the dequeued data is subjected to smoothed jitter. The total number of packets capable of being stored in the buffer is represented by the maximum buffer size, while the minimum number of packets is LWM_TH. The "count" gives the number of packets in the buffer at any time, while the low water mark (LWM) indicates how far the buffer is away from underflow, and the high water mark (HWM) tracks the delay within the buffer.

Figure 2A:
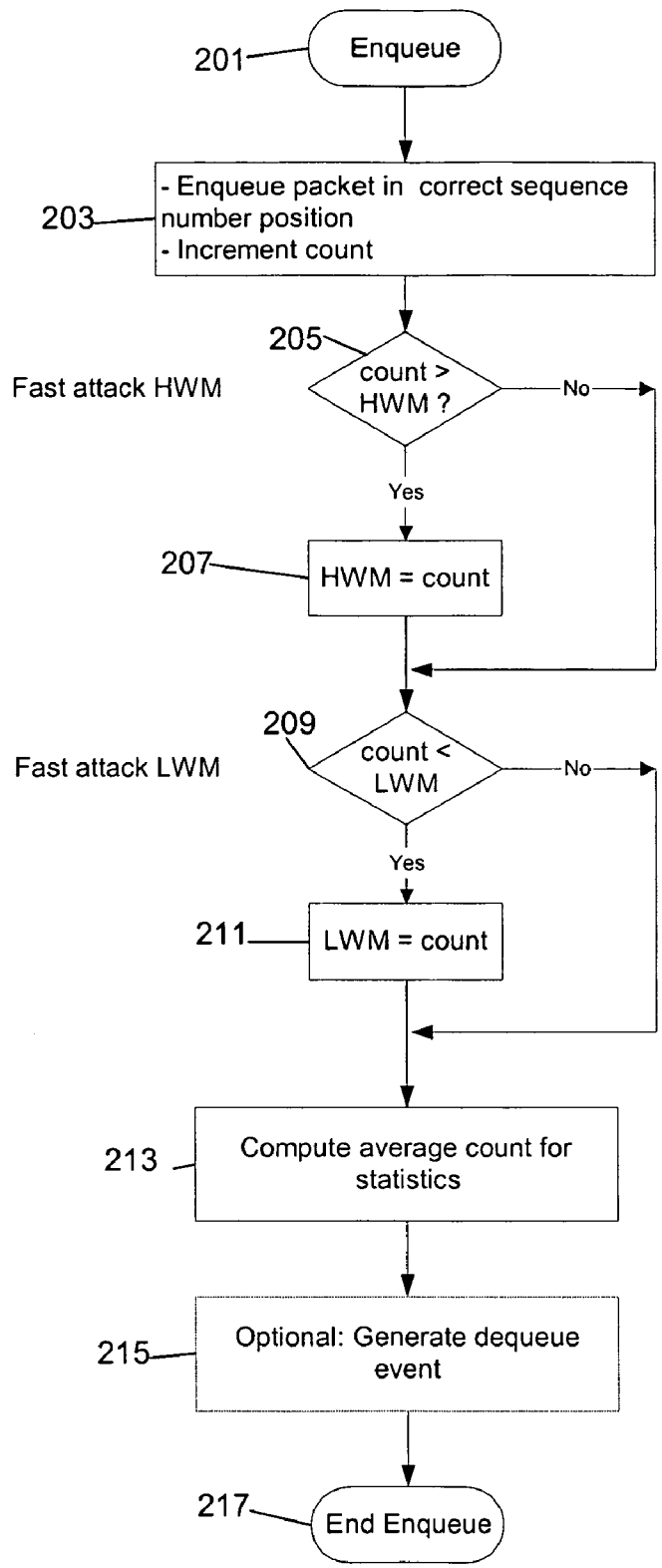
FIGS. 2A, 2B and 2C are flowcharts showing steps for enqueueing and dequeueing data into and out of the jitter buffer of FIG. 1, including adjustment of watermark levels governing the rate of dequeueing data based on network conditions, according to the present invention.
Figure 2B:
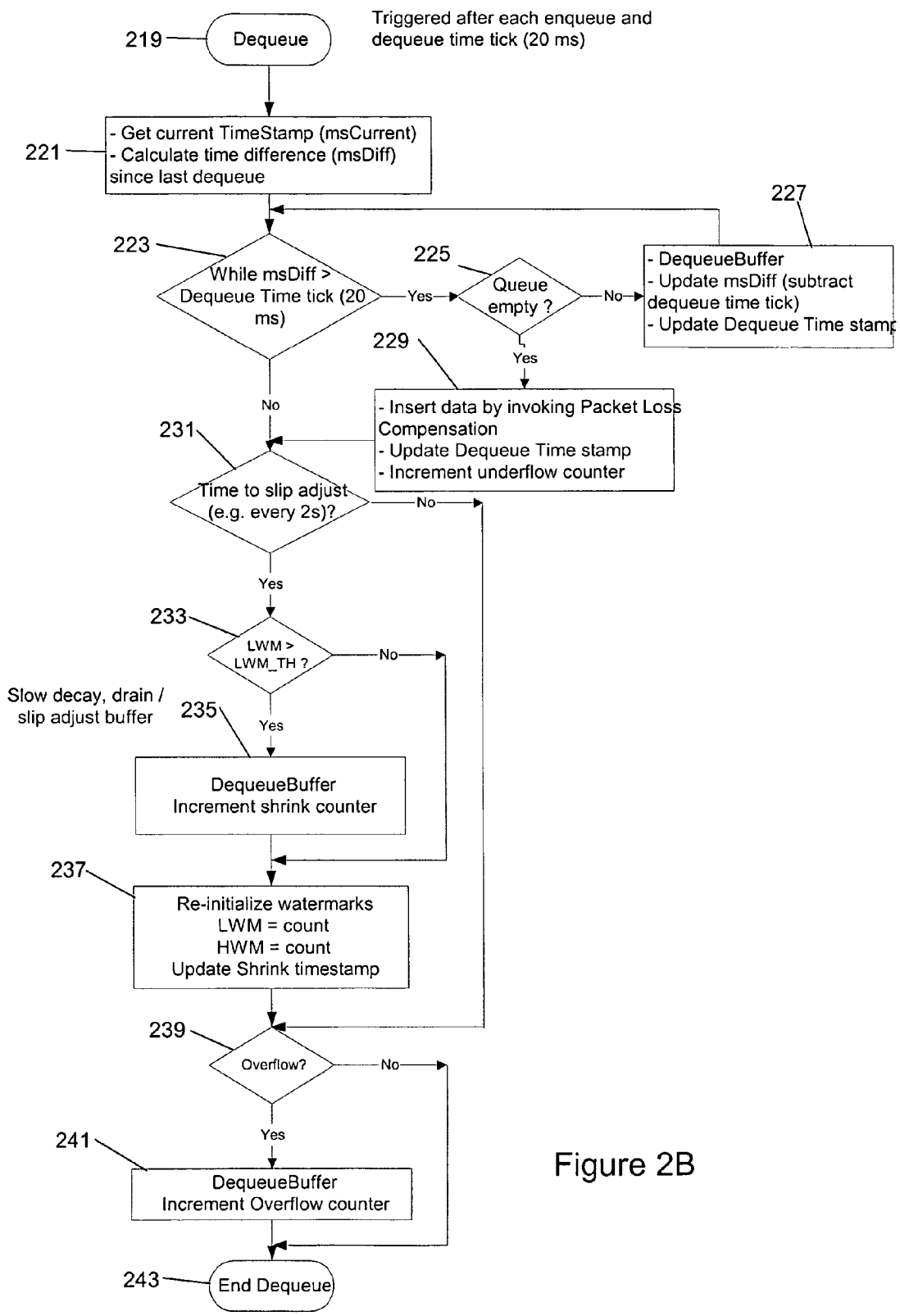
Figure 2C:
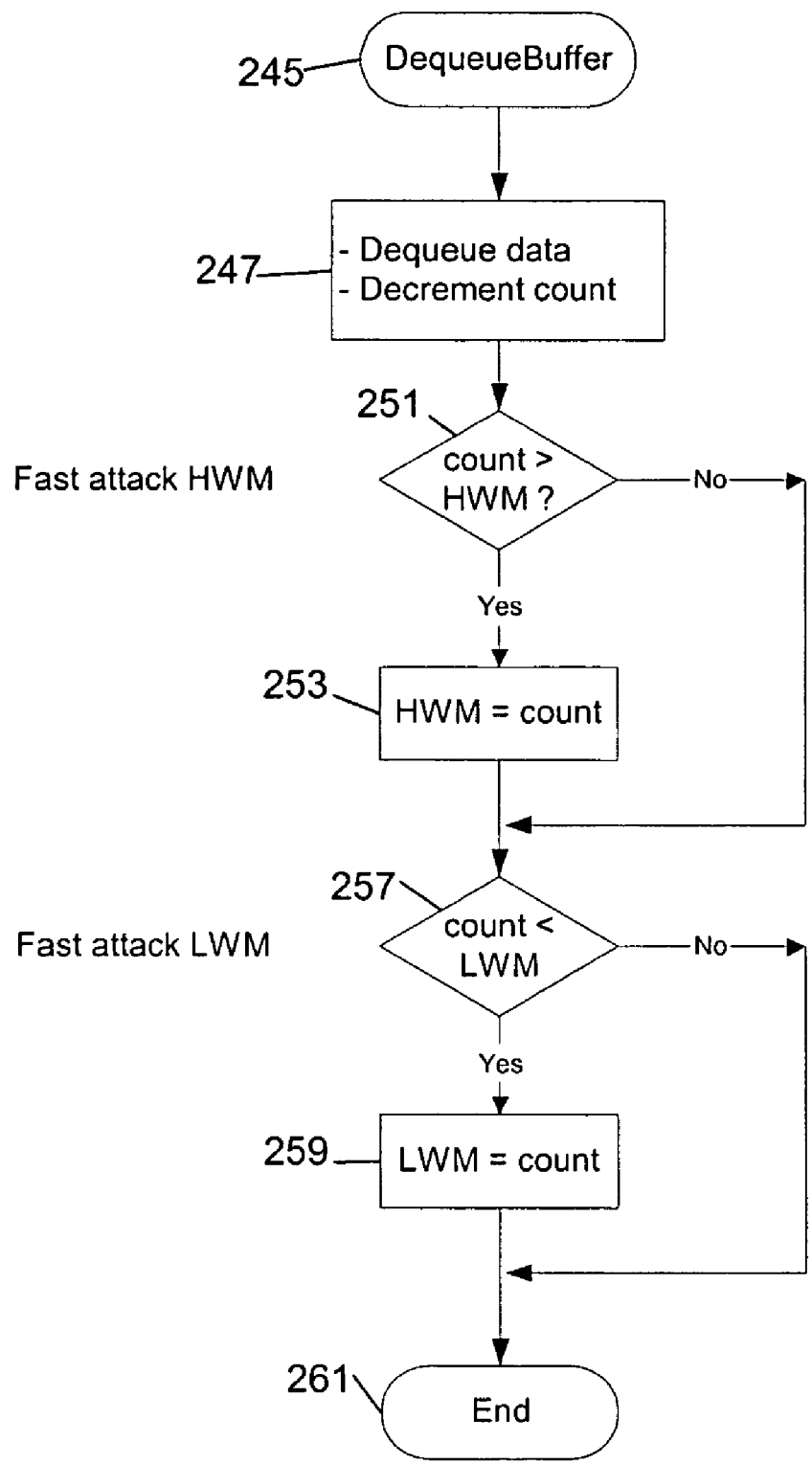

Turning to FIG. 2, upon receipt of a data packet an Enqueue event is initiated (step 201 of FIG. 2A). The received packet is loaded into the buffer in correct sequence number position, and "count" is incremented to reflect the current number of packets (step 203).

If count exceeds HWM then HWM is set to count (step 205). If the count does not exceed HWM, or after step 205, a determination is made as to whether count is less than LWM (step 209). If it is, then LWM is set to count (step 211). If count is not less than LWM, or after step 211, the average count is computed for statistics purposes (step 213).

Optionally, a dequeue event (FIG. 2B) is generated (step 215), and the Enqueue process ends (step 217).

The Enqueue event may be implemented in software as follows:

```
Enqueue
For every packet
    Enqueue packet in correct seq num position
    Increment count      // number of packets in queue
    /* Adjust watermarks, if required (fast attack) */
    IF count > HWM
        HWM = count      // adjust HWM
    ENDIF
    IF count < LWM
        LWM = count
    ENDIF
    Average current count in buffer
ENDFOR
```

A Dequeue event (FIG. 2B) may be generated after each Enqueue (step 215), and is generated in any event each Dequeue Time Tick (e.g. 20 ms).

First, the current Dequeue TimeStamp (msCurrent) is obtained and the difference (msDiff) between the current and previous TimeStamps is calculated, representing the time since the last Dequeue event (step 221).

If msDiff is greater than the Dequeue Time Tick, a determination is made as to whether the buffer is empty (step 225). If not, a DequeueBuffer event is generated (FIG. 2C), and both msDiff and Dequeue Time Stamp are updated.

If the buffer is empty (indicating an underflow condition), data is inserted into the packet stream by invoking well known packet loss concealment, an underflow counter is incremented and the Dequeue Time Stamp is updated (step 229).

If msDiff is not greater than the Dequeue Time Tick, or after step 229, a determination is made as to whether a predetermined time period (e.g. 2 s) has elapsed since the last slip adjust (step 231).

If yes, then if LWM exceeds LWM_TH (step 233), then a DequeueBuffer event is generated and a shrink counter is incremented (step 235). Next, or if LWM does not exceed LWM_TH, then the watermarks are re-initialized to the count value and a Shrink timestamp is updated (step 237).

If the time to slip adjust has not yet elapsed (step 231), or in any event after step 237, a determination is made (step 239) as to whether the buffer is overflowing (i.e. count>max buffer size). If yes, a DequeueBuffer event is generated and an Overflow Counter is incremented (step 241).

If the buffer is not overflowing, or in any event after step 241, the Dequeue event ends (step 243).

The Dequeue event may be implemented in software as follows:

```
Dequeue
    FOR every enqueue or 20ms tick   // JB dequeue triggered
        Get current time stamp
        Calculate time difference (msDiff) since last dequeue
        WHILE msDiff > 20ms
            DequeueBuffer
            IF queue empty,
                Save current dequeue time
                Increment underflow counter
                break out
            END
            msDiff = msDiff – 20ms
            Update current dequeue time
        END WHILE
        // Check whether we have to slip adjust or are still in
        overflow
        FOR every jitter_Q_shrink_rate (currently 2s) time event
            IF LWM > LWM_TH (currently 1) (slow drain, deacy)
                DequeueBuffer   // dequeue another packet, slip adjust
                Increment shrink counter
            ENDIF
            /* Re-initialize watermarks */
            LWM = count
            HWM = count
            Update shrink Timestamp
        ENDFOR
        IF num of packets > Jitter size     // Overflow checked on
        every enqueue and dequeue tick
            DequeueBuffer // Dequeue another packet
            Increment overflow counter
        ENDIF
    ENDFOR
```

The DequeueBuffer event (FIG. 2C) governs the unloading of packets from the buffer. Following instantiation of the DequeueBuffer event (step 245), the data packets or dequeued from the buffer and count are decremented accordingly (step 247).

If count exceeds HWM, then HWM is set to count (step 253). If not, and in any event after step 253, a determination is made (step 257) as to whether count is less than LWM. If yes, then LWM is set to count. If count is not less than LWM, and in any event after step 253, then the DequeueBuffer event ends (step 261).

The Dequeue event may be implemented in software as follows:

```
DequeueBuffer
BEGIN
    Dequeue data
    Decrement count      // number of packets in queue
    /* Adjust watermarks, if required (fast attack) */
    IF count > HWM
        HWM = count    // adjust HWM
    ENDIF
    IF count < LWM
        LWM = count
    ENDIF
END
```

From the foregoing description, it is apparent that the algorithm for controlling enqueueing and dequeueing of data packets according to the present invention minimizes the delay within the buffer by using a quick 'attack', at the expense of preventing buffer underflow. Since it is very difficult to predict network behavior, control of the buffer is biased towards introducing a minimum delay by adapting quickly to large jitter events and by inserting additional packets using packet loss concealment during buffer underflow. After a large jitter event, the buffer contains several packets and the delay introduced by the buffer is equivalent to the jitter length. When network conditions normalize, the delay within the buffer is far larger than is required (i.e. the actual current jitter is smaller than the buffer delay). The buffer is drained slowly (at the slip or drain rate, currently set at 2 s). Consequently, control of the buffer is characterized by a slow decay time.

Figure 3:
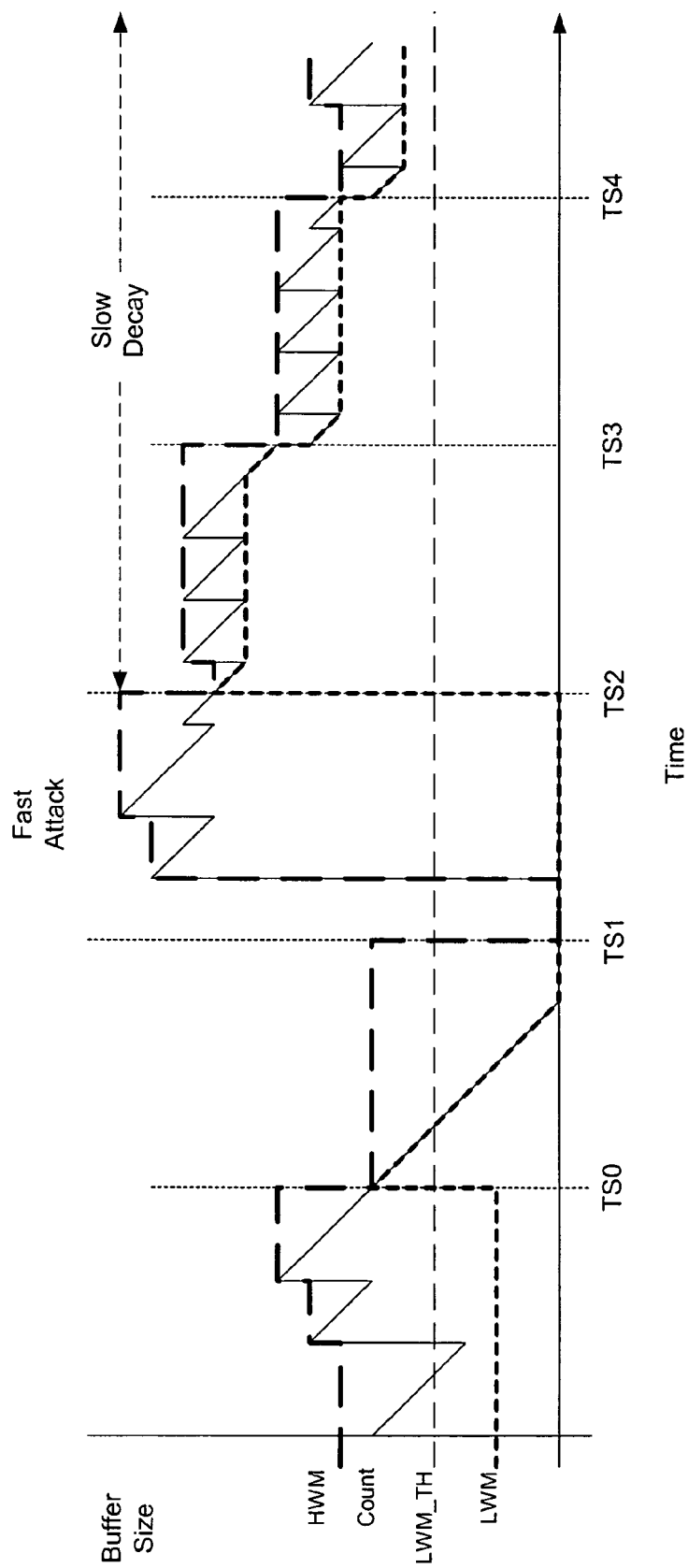
FIG. 3 is a diagram showing an example of the buffer contents over time, including the adjustment of watermark levels, according to the present invention.

FIG. 3 shows typical behaviour of the buffer under the enqueue and dequeue control algorithms of FIG. 2, including adjustment of watermark levels over time. It will be noted that the buffer control is dependent only on the low water mark (LWM), and that data is inserted when the buffer is in underflow (count=0 and LWM=0). The draining of data occurs at the drain rate when count exceeds LWM. The high water mark (HWM) is tracked for statistics purposes only, and is not used to control the buffer.

It will also be noted from FIG. 3 that after a network congestion event, which forces the buffer into underflow Oust prior to time stamp TS1), the buffer accepts all data after the congestion disappears (fast attack following TS1). Then, slowly over time, the delay is again drained out of the buffer (TS2, TS3, TS4). Normal operation (no attack, no drain) is when the LWM returns to below LWM_TH.

It will be appreciated that, although embodiments of the invention have been described and illustrated in detail, various modifications and changes may be made.

In one alternative embodiment, the number of packets (count) is averaged within the Enqueue event and the watermarks are adjusted relative to this average value. Specifically, the LWM is adjusted upwardly if the average count exceeds LWM, and the high water mark is adjusted downwardly if the average count is less than HWM. In other words, the watermarks decay towards the average count in the buffer.

According to a second alternative embodiment, the decay adjustment may be performed during the Dequeue event, on every slip adjust event, in which case no average count is calculated.

Also, different drain strategies can be used than as set forth herein. For example, a faster drain rate may be used when the delay within the buffer is long and a slower rate used when the delay is short. Also, since the high water mark is an indication of the delay within the buffer, it can be used as well in controlling the buffer.

Different implementations may be made by those familiar with the art, without departing from the scope of the invention as set forth in the claims appended hereto.

What is claimed is:

1. A method of controlling a buffer for reducing litter in a packet network comprising:
   a) receiving packets into said buffer with a fast attack rate, for each packet, loading the packet into said buffer in correct sequence number position, incrementing said count value, if the count value exceeds said high watermark value then setting said high watermark value to said count value, and if said count value is less than said low watermark value then setting said low watermark value to said count value;
   b) draining packets from said buffer with a slow decay rate, said draining comprising;
   i) obtaining a current Dequeue Timestamp;
   ii) calculating the difference between the current Dequeue Timestamp and a previous Dequeue Timestamp is calculated;
   iii) if the difference is greater than a Dequeue Time Tick, a determination is made as to whether the buffer is empty and if the buffer is not empty a DequeueBuffer event is generated and both the difference and Dequeue Time Stamp are updated;
   iv) if the buffer is empty data is inserted by invoking a packet loss concealment, and the Dequeue Time Stamp is updated;
   v) following step iv) or if the difference is not greater than the Dequeue Time Tick, a determination is made as to whether a predetermined time period has elapsed since a previous buffer slip adjustment;
   vi) if said predetermined time period has elapsed, then it said low watermark exceeds a low watermark threshold then a DequeueBuffer event is generated and a shrink counter is incremented;
   vii) if said low watermark does not exceed said low watermark threshold, then said high watermark and said low watermark are set to said count value;
   viii) following step vii) or if said predetermined time period has not yet elapsed, a determination is made as to whether the buffer is overflowing, in response to which said DequeueBuffer event is generated; and
   c) maintaining a count value of packets in said buffer;
   d) maintaining at least a low watermark value representing a minimum of said count value over a time period;
   e) once within each said period setting said low watermark value equal said count values;
   f) maintaining a high watermark value representing a maximum of said count value over said time period; and
   g) setting said high watermark value equal to said count value simultaneously with setting said low water value equal to said count value.

2. The method of claim 1, wherein said DequeueBuffer event comprises, for each packet dequeueing said packets from the buffer and decrementing said count value, and if the count value exceeds the high watermark value then setting the high watermark value is set to the count value, and if the count value is less than said low watermark value then setting the low watermark value to the count value.

* * * * *

UNITED STATES PATENT AND TRADEMARK OFFICE
CERTIFICATE OF CORRECTION

PATENT NO. : 7,573,894 B2
APPLICATION NO. : 10/780220
DATED : August 11, 2009
INVENTOR(S) : Schulz et al.

Page 1 of 1

It is certified that error appears in the above-identified patent and that said Letters Patent is hereby corrected as shown below:

Col. 5, Claim 1:
Line 1, "reducing litter" should be "reducing jitter"
Line 7, "selling said high watermark" should be "setting said high watermark"
Line 29, "vi) if said predetermined time period has elapsed, then it" should be
        "vi) if said predetermined time period has elapsed, then if"
Line 44, "value equal said count values;" should be "value equal said count value;"

Signed and Sealed this

Twenty-seventh Day of July, 2010

David J. Kappos
*Director of the United States Patent and Trademark Office*